Dec. 15, 1942.     C. B. STRAUCH     2,305,205

PNEUMATIC PROTECTOR FOR AUTOMOBILES

Filed Oct. 2, 1939

INVENTOR.

Clauss Buckart Strauch

Patented Dec. 15, 1942

2,305,205

UNITED STATES PATENT OFFICE 2,305,205

PNEUMATIC PROTECTOR FOR AUTOMOBILES

Clauss Burkart Strauch, Milwaukee, Wis.

Application October 2, 1939, Serial No. 297,545

8 Claims. (Cl. 280—152)

This invention relates to improvements in pneumatic protectors of automobiles and means to improve the construction of pneumatic fenders and more particularly to novel constructions adapted to lessen the dangers of automobile accidents and to diminish the injury to objects including the car itself and to persons, including outside persons as well as the occupants of the car.

This case is a continuation in part of my co-pending application Serial #260,672, filed March 9, 1939, now Patent No. 2,218,690, issued October 22, 1940.

Heretofore, automobiles have been provided with fenders, constructed merely for streamlining and decorative purposes and against the dirt thrown from the wheels. They consist of thin walled, decorated metal bodies, lately of large dimensions, which are easily marred and crushed by any impact, leading to repeated and costly repairs, without offering any protection in collisions.

The bumpers are generally made of heavy steel, showing a hard spring action when colliding with a resistant object and an unyielding metallic impact when hitting delicate objects such as the soft tissues of human beings. These bumpers offer little or no protection when the car is hit in any other direction outside of the longitudinal axis; furthermore, they are generally provided with protruding ends acting as a thorn or hook leading to entanglements and accidents.

Elastic fenders have been devised made fully or in part of rubber, reducing minor repairs but not effecting any worthwhile protection in accidents.

Pneumatic bumpers have been proposed, built in tubular shape which, as known from automobile's tires, will not change form when pressure inflated. These bumpers provide a resilient protective action over the long and narrow area they are adapted to cover.

It is well known that containers made of flexible material such as rubber will tend to assume rounded and spherical shapes when inflated under pressure. The pneumatic fenders, which have been proposed, consist, therefore, of relatively heavy walls containing a relatively small air space, inflated at low pressure to obviate change of shape. Such pneumatic fenders protect in collisions chiefly by the elasticity of the heavy walls of the casings, and do not substantially utilize the essential resiliency of compressed air, in such degree as accomplished in present day automobile tires.

It is my invention, as described in my copending application Serial #260,672, to construct pneumatic cushions in the shape of protruding fenders; forming integral, detachable parts of the car; the cushions consisting of relatively thin outer casings composed of fabric, rubber and optionally wires; each carrying an innertube filled with air under pressure and inflating the cushions to firm, but yielding, resilient, elastic protectors, which term includes pneumatic fenders acting at the same time as bumpers by their protruding outer poles respectively as resilient bases for bumper rods attached to these poles.

As described in my application #260,672 the shape of the pneumatic fenders is maintained by providing the casings with large windows on such places where they contact the body of the car or special supports, and connecting these windows to the rigid metal of the body and supports, which tend to hold the shape of the fenders when pressure inflated.

Protectors, according to my invention, will act as fenders and bumpers and will absorb shocks from all four corners and sides of the automobile and will cushion all surfaces liable to be involved in accidents, protecting car and occupants as well as outside persons or objects, colliding with the car.

It is my present invention to provide additional methods for holding the pneumatic protectors in my desired shape when inflated; to provide means for constructing non-bulging pneumatic fenders or protectors in any form necessary for technical, practical or artistical purposes; to permit construction of pneumatic fenders, which react chiefly by the resiliency of the enclosed compressed air and less by the elasticity of the enclosures; to provide pneumatic fenders made of flexible and flabby casings having no firm form of their own, when not inflated, and offering little resistance by their structure, but becoming firm, well shaped, resilient bodies when inflated reacting as shock absorbing means similar to balloon tires, yet not limited to circular, tubular, spherical or convex shapes.

Another object of my invention is to provide pneumatic fenders, which are resistant to perforations by sharp objects.

Other objects of my invention will be apparent in connection with the following description.

With the foregoing objects outlined and with other objects in view which will appear as the description proceeds, the invention consists in the novel features hereinafter described in details, illustrated in the accompanying drawing, and more particularly pointed out in the appended claims.

I attain the objects described before by the utilization of methods illustrated in the accompanying drawing, in which identical numerals designate identical parts.

In the drawing: Figure 1 is plan view of a right front protector according to my invention, the body of the car shown in horizontal sectional view and the outline of the wheel and of the lower metal supports indicated by interrupted lines.

Figure 1:
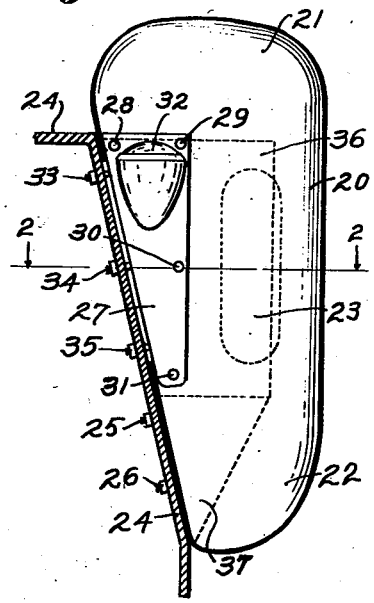

In Figure 1, 20 is the outer side of the right front protector, which has the freely compressible anterior pole 21, acting as a bumper and the freely compressible rear pole 22. 23 is the outline of the right front wheel. The protector 20, 21, 22, has a large window of which a portion is fastened to the body or frame 24 by the bolts 25 and 26. Another part of the window is fastened to a horizontal slightly curved bracket 27, by the bolts 28, 29, 30 and 31. This bracket may carry the right headlight 32 and is fastened itself to the body 24 by the screws 33, 34 and 35. The lower part of the window is fastened to the metallic arch 36, a detachable part of the frame of the car, and to the bracket 37, uniting the rear end of the arch 36 with the body 24 of the car.

Figure 2:
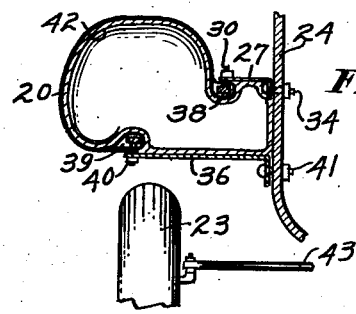
Figure 2 is a vertical sectional view in line 2—2 of Figure 1.

In Figure 2 it is seen how the casing 20 is fastened in its upper bead 38 to the rigid bracket 27 by the screw 30, while its lower bead 39 is screwed to the arch 36 by the bolt 40, the arch 36 being fastened to the body 24 of the car by the bolt 41. The innertube 42 is, therefore, contacting a flexible surface 20, representing part of the casing of the pneumatic fender 20, 21, 22 and metallic and rigid surfaces as follows: the arch 36, the body 24 of the car and the lower surfaces of the bracket 27. These metallic surfaces, against which the innertube is pressing may preferably be supplied with a suitable coating or may be covered by fibrous tissues or cloth to protect the tube. I found that a cheap and practical coating can be obtained by cementing paper or cloth to the metal by means of a lacquer or varnish. 43 is the axle of the wheel 23. The connection between this axle and the body 24 is not shown.

Figure 3:
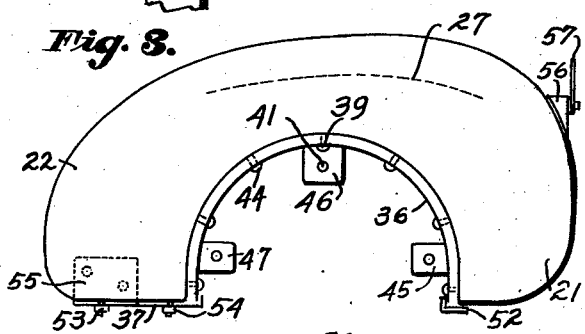
Figure 3 is a side view of the right front protector, seen after the wheel has been taken off.

In Figure 3, the projection of the bracket 27 is shown by an interrupted line. The fender is seen from the outside resting on the arch 36, to which it is fastened by screws such as 44. The arch itself is fastened to the body of the car by the brackets 45, 46 and 47 by screws such as 41. The arch 36 is well suited to harbor in its cavity the wheel or part of it and prevent any injury to the wheel centre 48, the axle 43, and to the spring and the steering mechanism, known as delicate parts of the front wheel suspension.

The anterior end of the arch 36 may be strengthened by beam 52, Figure 3, which may run across the front of the frame of the car, fastened to the center of the frame. The posterior end of the arch 36 may be engaged to the anterior part of the bracket 37. In this bracket, the window of the protector end 22 is attached by the screws 53 and 54, while the bracket itself is detachably mounted to the body of the car by its side 55.

56 is a wedge-shaped piece of rubber or other flexible material, firmly attached to the surface of the pole 21, carrying provisions for holding the license plate 57 and forming an elastic support for the same which will diminish the injury to the plate in collisions.

Figure 5:
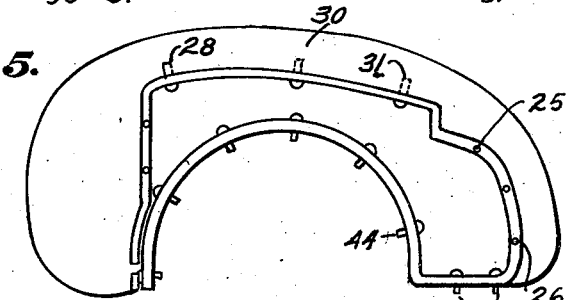
Figure 5 shows the detached protector seen from the inner side.
Figure 4:
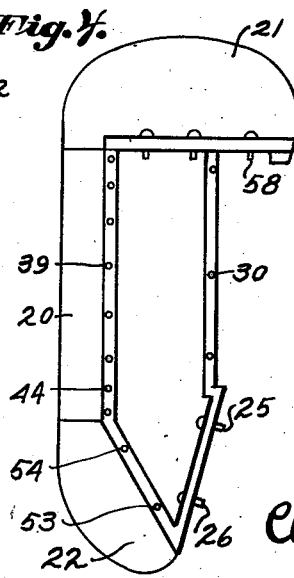
Figure 4 shows the right front protector detached and seen from below.

Figure 4 and Figure 5 show the right front casing detached, to visualize the extent of the window. The beads surrounding the window show some of the screws in their place to indicate the direction of the attachments. The screws such as 58 will attach to the anterior part of the arch 36. The other screws are easily identified by their numerals and by the previous description.

Figure 6:
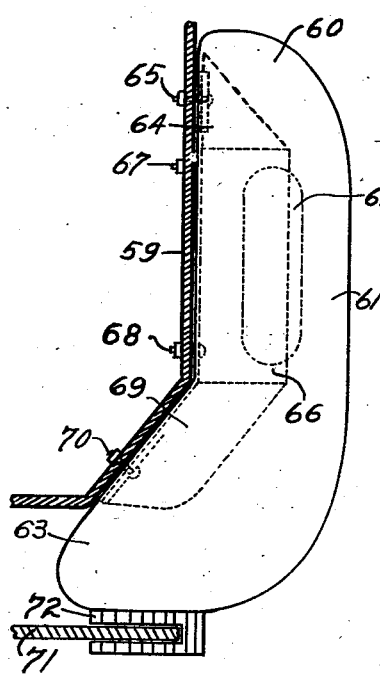
Figure 6 is a plan view of the right rear fender carrying a bumper attached, the interrupted lines indicating the outline of the lower metallic supports, and of the wheel.

In Figure 6, illustrating the right rear fender, 59 represents a horizontal section of the body or frame of the automobile, to which the pneumatic fender is attached. 60 is the freely compressible anterior pole of the fender, 61 its side, arching above the wheel 62, and 63 is the freely compressible rear pole. The lower supports to which a part of the window of the fender is fastened consist of the bracket 64, detachably secured to the body 59 by the screw 65, of the arch 66 attached to the body by the screws 67 and 68, and of the bracket 69 attached by the screw 70. The balance of the fender window is fastened to the body 59 of the car, similarly as described for the front fender, except for the omission of an upper bracket, provided optionally at the front fender for carrying the headlight, as described before.

Pneumatic fenders or protectors as described in the Figures 1–6, can be constructed and shaped in many forms without leaving my invention. The forms illustrated in detail serve merely as an example. My invention includes protectors, as the term has been defined before, protruding over the ends of the car straight, curved or in U-shapes, acting as a bumper at the same time; or they may be protruding and be shaped as above, but be provided with extra guards serving as bumpers and to cover the space between the two fender poles of each end, if these poles are not constructed to unite or come close to each other. The use of a separate bumper has special advantages at the rear of the car, where it permits access to the baggage compartment. In Figure 6, 71 represents a bumper. I prefer to fasten the ends of such bumper to the outer surface of relatively heavy rubber plates vulcanized to the surface of the casing, to avoid injury to the casing in accidents. 72 represents such a flexible plate, which may, as shown, enclose the end of the bumper in a shoe to secure it, but still permitting easy detachment. The bumper may be of metal such as spring steel or of other rigid or elastic materials. It may be one unit or may possess a yielding centre to limit shocks to one side. As shown in Figure 6, the bumper is carried and cushioned by the fender. Without leaving my invention, the bumper may also be supported by a springy or hinged bracket, extending from the body of the car and taking the weight of the bumper from the fender poles without impairing their cushioning and shock absorbing support in collision.

Figure 7:
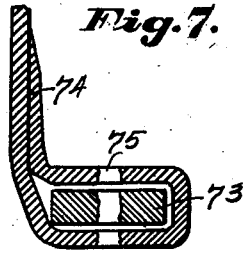
Figure 7 shows in detail a preferred form of bead construction, pictured in vertical sectional view.

In Figure 7, 73 is the metallic core and 74 the surrounding casing of a preferred bead encircling the window of pneumatic protectors according to my invention. Core and casing are vulcanized into one unit. The core 73 is provided with holes such as 75 for screws or bolts to fasten the bead to the body of the car respectively to the various supports described. The hole 75 may be threaded or the screws may be made an integral part of the core to facilitate assembly and detachment.

Each automobile constructed according to my invention will be provided with 4 protectors respectively pneumatic fenders, as described, each carrying an innerbladder to be inflated as in tires. I prefer to inflate the innerbladders from a central valve, conveniently located, where, at the same time, the pressure can be read from a gauge. This does not exclude to place valves such as simple cone and ball valves at points in the pipelines leading from the central station to each of the innertubes, for the purpose of inhibiting the rapid transfer of compression waves during shocks from one fender to the other. For certain purposes the free communication of all 4 cavities may be preferred. I found that a rather low pressure, such as 10 lbs. per square inch will give satisfactory protection, without limiting the pressure, however to this figure.

The construction as described in Figures 1-7 has the following advantages: all shocks affecting the protectors are ultimately counteracted by either the body of the car or the support arch or both, the protector forming a securely held, resilient but firm cushion between car and colliding objects. The protector is easily assembled and easily detached. For assembly, the arch and all brackets are first screwed to the bead of the casing; the innerbladder is then inserted; and this whole unit is finally moved sidewise into place and attached to the car. Other methods of suspending the protectors can easily be devised by those experienced in the art, following the general principles outlined above. The utilization of metallic surfaces as parts of the enclosure for the innertube, also saves the more expensive flexible material used in the casing proper, and will not diminish the resilient and shock-absorbing effect, since the rigid walls are limited to surfaces not contacted directly in collisions. The rigid walls are most important however, for the effect of holding the casing in the desired shape which corresponds approximately to an oversize fender of a present day automobile, protruding with freely compressible poles over front and rear of the car, and for preventing disfiguration of this streamlined form into convex and symmetrically rounded, spherical, ovular or tubular shapes which are generally assumed by pressure inflated flexible and elastic bodies. As an example, I state, that without being held by the arch, the fender would assume first a straight somewhat tubular shape and on increasing pressure of inflation an irregular rounded form, fully unsuited for the purpose. Following the construction according to my invention as described, the arch, forming part of the fender cavity, will hold the adjoining part of the pneumatic casing in a concave arched shape; the upper bracket of the front fender will diminish a bulging of the upper surface of the casing and the other brackets and the side of the car will furnish rigid and unyielding boundaries holding the pneumatic casing close to its desired shape.

The material used for construction of the protectors according to my invention is substantially the same as used in the manufacture of automobile tires. The protectors differ in function, however, from tires inasmuch as they represent non-moving inflated bodies which at rare occasions only, in collisions, are subjected to a test of their strength and resiliency, while tires are constantly subjected to flexing and bending and are also affected by abrasion and heat caused by friction. In tires, the circular tubular shape is a natural pneumatic form and is easily retained under pressure inflation while in pneumatic fenders the shape is artificial and tends to change with increasing inflation. In tires the cavity is relatively small, while in the fenders the cavity is large, requiring more strength of the wall, at equal pressures. Tires are rarely subjected to cutting violence, while in collisions the fenders may conflict with pointed and sharp objects, acting with great force. I prefer, therefore, optionally to include metals in the construction of casings for pneumatic fenders, in the shape of wires, steelbands or formed sheets in addition to the use of rubber and cellulosic fibers.

It is an essential part of my invention to construct casings for protectors from steel cables woven to form a cloth or screen or merely made a part of a cloth consisting of cellulosic fibers such as cotton. It is known in the art, that steel plates or parts can be firmly combined with rubber by various means and especially by brass plating the steel and vulcanizing it to the rubber. Such combinations, as for example the lining of steel tanks with rubber against corrosion, inhibit the flexible and resilient qualities of rubber. It is my invention to brass plate steelcable, to weave it into a screen or wire cloth and to vulcanize rubber to it so that a flat or formed sheet or casing is produced, preferably of such thickness that the surface is smooth and the cable structure is hidden. Layers of cellulosic cloth may optionally be included. The rubber adheres well to the brassplated cable due to its large and intricate surface and will in addition firmly cohere since it encloses the steel cable screen or cloth from all sides and since the two surfaces of the casing are firmly united by the rubber vulcanized in the interstices between the cable strands. Such casing is flexible, highly resistant to pressure and will protect the innertube against sharp force.

To hold fully the shape of the protectors, and to increase the resistance against perforations, I may use semi-rigid enforcements made part of the casing or placed in between casings and innerbladder and consisting of materials such as enforced rubber, cardboard, resin impregnated cloth, fiber, wire screen or metal sheet. These enforcements are preferably applied on such parts of the casing where the load is greatest, constructing the casing according to the principles known in the art of building pressure tanks. As an extreme, I have constructed protectors of which the casings were made completely of thin, elastic metal, optionally provided with slots or other cut outs to increase the flexibility and optionally covered by a layer of rubber as a flexible coating.

Utilizing the principles of construction described before as my invention, it is made possible to construct pneumatic cushions of streamlined shape; of relatively light weight and low cost; capable of being inflated without material change in shape; of great resiliency; of great resistance against bursting by pressure or sharp perforations; and ideally suited to act as efficient protectors for car and occupants in collisions.

While I have disclosed what I now consider to be some preferred embodiments of the invention in such manner that they may be readily understood, it is manifest that changes may be made in the details disclosed without departing from the spirit of the invention as expressed in the claims.

I may substantiate such possible changes by stating that in pneumatic fenders sufficiently braced, and especially in pneumatic fenders consisting fully of metal, including casings made of thin and elastic metal, such as described before, the innertube may be omitted and may be substituted by forming the fender as a fully enclosed cavity securely fastened to the body of the car and sealed airtight, except for an opening leading to the inflating valve. To employ inflated airtight steel, brass or aluminum fenders or cushions adds very little to the cost of a car; does not change the appearance of the automobile; will greatly add to the safety of the car in collisions interposing substantial pressure resistant bodies between the essential parts of the car and outside forces; but will be subject to dents, easily removed by excessive inflation, and are less resilient than the freely elastic casings described before.

What I claim and desire to secure by Letters Patent is:

1. A protective fender construction for automobiles in combination with an automobile body having wheels and having metal side parts, said fender having a curved metal portion over each wheel thereof, supported from the body portion, and having metal brackets extending from the metal sides above at least some of the curved metal portions, said protective fender construction comprising an outer casing formed of inextensible, relatively yielding material cut away adjacent and supported by at least a portion of aforesaid side parts, curved parts and brackets and an inflated innertube located within said outer casing completely enclosed by said casing and said supporting parts.

2. A yielding fender construction for automobiles in combination with an automobile body having a metal side portion, said fender construction having metal members projecting outwardly from the metal side portion of said automobile body and spaced apart and having a freely flexible outer member extending from the outer edge of one projecting metal member to the outer edge of the other projecting metal member, said fender construction including pneumatic means enclosed within said freely flexible outer member and included between the outwardly projecting metal members, said outwardly projecting metal members and said metal side portion directly resisting shocks imparted to said fender construction from the front, rear or outer side thereof, whereby said projecting metal members not only form continuations of the freely flexible outer member but also together with said metal side portion form direct bearing areas for resisting the force of said shocks through direct compression of the pneumatic means.

3. A yielding fender construction for automobiles in combination with an automobile body having metal side portions and having wheels, said fender construction having upper and lower metal members projecting outwardly from the metal side portions of said automobile body and spaced apart, the lower of said projecting metal members being upwardly arched to partially enclose a wheel, freely flexible outer members secured to and extending from the outer edge of upper metal members to the outer edge of the corresponding lower metal members, said fender construction including pneumatic means enclosed within said freely flexible outer members and included between the outwardly projecting metal members, said outwardly projecting metal members and said metal side portion directly resisting shocks imparted to said fender construction from the front, rear or outer side thereof, whereby said metal members not only form continuations of the freely flexible outer member but also, together with said metal side portions, form direct relatively extensive bearing areas for resisting the force of said shocks through direct compression of said pneumatic means.

4. A yielding fender construction for automobiles in combination with an automobile body having metal side portions, said fender construction having metal members projecting outwardly from the metal side portions of said automobile body and spaced apart and having a freely flexible outer member cut away on at least two sides thereof with the margins at said cut away portion secured to said outwardly projecting metal members and to the said metal side portions, said freely flexible outer member forming a continuation of said outwardly projecting metal members and extending outwardly therefrom, and a pneumatic inner member enclosed within said freely flexible outer member and included between the outwardly projecting metal members and bearing against said outwardly projecting metal members and against said side portions, said metal members forming a rigid extension of the flexible outer member and preserving its shape and arranged opposite the flexible parts to form bearing areas to resist the force of all shocks.

5. In an automobile the combination of a fender construction including metallic supporting means projecting outwardly from the body of the automobile on opposite sides thereof, a yielding pneumatic fender construction carried by said supporting means and located on opposite sides of the automobile and projecting outwardly therefrom and forming a continuation of said supporting means, said yielding pneumatic portions extending outwardly beyond the end of the automobile body, and a bumper secured to the outwardly projecting ends of said pneumatic fender, said metallic supporting means being arranged directly opposite said bumper, whereby the force of a blow imparted to said bumper is transmitted directly to said supporting means through the direct compression of said pneumatic fender construction and is resisted by the direct compression of the pneumatic fender construction between said bumper and said supporting means.

6. A yielding fender construction for automobiles in combination with an automobile body having a metal side portion, said fender construction having metal members extending outwardly from the metal side portion of said automobile body and spaced apart and having a freely flexible inextensible outer member extending from the outer edge of one metal member to the outer edge of the other metal member, and pneumatic means enclosed within said freely flexible inextensible outer member and included between the outwardly projecting metal members, said outwardly projecting metal members and said metal side portion directly resisting shocks imparted to said fender construction from the front, rear or outer side thereof, whereby said metal members not only form continuations of the freely flexible inextensible outer member but also together with said metal side portion form direct bearing areas for resisting the force of said shocks through the direct compression of the pneumatic means.

7. A yielding fender construction for automobiles in combination with an automobile body having metal side portions and having wheels, said fender construction having an upper and a lower metal member extending outwardly from the metal side portions of said automobile body and spaced apart, the lower of said metal members being upwardly arched to partially enclose a wheel, a freely flexible inextensible outer member secured to and extending from the outer edge of one metal member to the outer edge of the other metal member, and pneumatic means enclosed within said freely flexible inextensible outer member and included between the outwardly projecting metal members, said outwardly projecting metal members and said metal side portion directly resisting shocks imparted to said fender construction from the front, rear or outer side thereof, whereby said metal members not only form continuations of the freely flexible inextensible outer member but also, together with said metal side portions, form direct relatively extensive bearing areas for resisting the force of said shocks through the direct compression of the pneumatic means.

8. A yielding fender construction for automobiles including an inner metal wall and at least two spaced metal walls projecting therefrom, a yielding pneumatic portion secured to and carried by said projecting metal walls, said inner metal wall and said projecting metal walls forming supporting means and being arranged directly opposite to the corresponding parts of said pneumatic portion to thereby provide relatively extensive areas to directly resist the force of shocks imparted to all parts of said fender construction, and wherby said shocks are resisted by direct compression of said yielding pneumatic portion as distinguished from a mere flexing of said pneumatic portion.

CLAUSS BURKART STRAUCH.